United States Patent
Tong et al.

(10) Patent No.: US 12,306,862 B2
(45) Date of Patent: May 20, 2025

(54) INFORMATION EXTRACTION FOR UNSTRUCTURED TEXT DOCUMENTS

(71) Applicant: S&P Global Inc., New York, NY (US)

(72) Inventors: Baojia Tong, Cambridge, MA (US);
Delphine Vendryes, Venice, CA (US);
Nabeel El-Husayni, Boston, MA (US);
Andrey Ryazanov, Boston, MA (US);
Vadym Barda, Boston, MA (US);
Hamima Halim, Boston, MA (US);
Maxim Sokolov, Watertown, MA (US);
Jilin Wang, Cambridge, MA (US);
Chester Curme, Braintree, MA (US)

(73) Assignee: S&P Global Inc., New York, NY (US)

( * ) Notice: Subject to any disclaimer, the term of this patent is extended or adjusted under 35 U.S.C. 154(b) by 140 days.

(21) Appl. No.: 17/663,367

(22) Filed: May 13, 2022

(65) Prior Publication Data

US 2023/0367800 A1 Nov. 16, 2023

(51) Int. Cl.
*G06F 16/35* (2025.01)
*G06F 18/214* (2023.01)
*G06N 3/04* (2023.01)

(52) U.S. Cl.
CPC ............ *G06F 16/35* (2019.01); *G06F 18/214* (2023.01); *G06N 3/04* (2013.01)

(58) Field of Classification Search
CPC ...... G06N 3/04; G06N 3/0464; G06N 3/0475; G06N 3/0495; G06N 3/0499; G06F 16/35; G06F 18/214
See application file for complete search history.

(56) References Cited

U.S. PATENT DOCUMENTS

| | | | |
|---|---|---|---|
| 9,424,668 B1* | 8/2016 | Petrou | G06T 11/206 |
| 2009/0083200 A1* | 3/2009 | Pollara | G06N 20/00 |
| | | | 706/14 |
| 2010/0128988 A1* | 5/2010 | Kincaid | G06V 10/945 |
| | | | 382/199 |
| 2021/0133438 A1* | 5/2021 | Florencio | G06F 18/41 |
| 2022/0156490 A1* | 5/2022 | Matiukhov | G06V 10/945 |
| 2022/0157403 A1* | 5/2022 | Mason | G16B 40/20 |
| 2022/0214322 A1* | 7/2022 | Song | G01N 33/0034 |
| 2023/0237409 A1* | 7/2023 | Mallikarjun | G06N 20/00 |
| | | | 705/7.37 |

* cited by examiner

*Primary Examiner* — Allen S Lin
(74) *Attorney, Agent, or Firm* — Yee & Associates, P.C.

(57) ABSTRACT

Training and using a machine learning model for data extraction is provided. The method comprises receiving keys of interest received from a user through an interface and receiving a batch of documents containing unstructured text. Unstructured text of a first document is processed to extract structured text. The model predicts text classifications of the structured text according to the keys of interest. The predicted text classifications are output to the user through the interface. Annotations to correct any incorrect predictions are received from the user, and the model is retrained according to the annotations. The above steps are repeated for less than ten additional documents from the batch until the model has been trained to predict text classifications with a specified level of accuracy. The trained model then classifies extracted structured text in the remaining documents in the batch.

24 Claims, 10 Drawing Sheets

FIG. 6

NEW CASE SHEET

| CASE #: | 16175 | CASE NAME: | Project | Pre-Deal | OPEN DATE: | 15 | September | 2016 |

DIFFERENT CASE NAME IN CLIENT COMMUNICATIONS?

BILL TO: John Smith, Esq

Please ☒ check attorney or consultant box below.

SALUTATION:

☒ ATTORNEY NAME/ADDRESS
☐ CONSULTANT NAME/ADDRESS

CLIENT NAME/ADDRESS

Sherlock Holmes
Detective
221B Baker Street, ~602
London NW1 6XE, UK

ADMIN/ASSISTANT NAME/ADDRESS

PHONE: +1 617-987-9049 ~604
FAX:
EMAIL: andrey.ryazanov@kensho.com

PHONE:
FAX:
EMAIL:

CASE DESCRIPTION: This is one of the many cases of Sherlock Holmes, alleged fictional detective and invention of Sir Arthur Conan Doyle.

COUNTRIES COVERED: U.K., Switzerland

ALL PARTIES (including subjects, lawyers and adverse parties for conflict check):
Sherlock Holmes,
John Watson Other Notes:

INFORMATION EXTRACTION FOR UNSTRUCTURED TEXT DOCUMENTS

BACKGROUND INFORMATION

1. Field

The present disclosure relates generally to an improved computing system, and more specifically to a method of extracting user-specific data from unstructured text documents.

2. Background

Many documents contain text in the form of unstructured text data. When dealing with large volumes of such documents, automated extraction is often the only feasible way to access and make practical use of such unstructured text data.

Therefore, it would be desirable to have a method and apparatus that take into account at least some of the issues discussed above, as well as other possible issues.

SUMMARY

An illustrative embodiment provides a computer-implemented method for training and using a machine learning model for data extraction. The method comprises receiving input of a number of keys of interest from a user through an interface and receiving input of a batch of documents containing unstructured text. The unstructured text of a first document from the batch is processed to extract structured text. The machine learning model then predicts text classifications of the structured text according to the keys of interest. The predicted text classifications are output to the user through the interface. Annotations to correct any incorrect predictions are received from the user through the interface, and the machine learning model is retrained according to the annotations. The above steps are repeated for less than ten additional documents from the batch until the machine learning model has been trained to predict text classifications with a level of accuracy specified by the user. The trained machine learning model then classifies extracted structured text in the remaining documents in the batch of documents.

Another illustrative embodiment provides a system for training and using a machine learning model for data extraction. The system comprises a storage device configured to store program instructions and one or more processors operably connected to the storage device and configured to execute the program instructions to cause the system to: a) receive input of a number of keys of interest from a user through an interface; b) receive input of a batch of documents containing unstructured text; c) process the unstructured text of a first document from the batch of documents to extract structured text; d) predict, with the machine learning model, text classifications of the structured text according to the keys of interest; e) output, through the interface, the predicted text classifications to the user; f) receive, through the interface, annotations from the user to correct any incorrect predictions; g) retrain the machine learning model according to the annotations; h) repeat steps c) through g) for less than ten additional documents from the batch of documents until the machine learning model has been trained to predict text classifications with a level of accuracy specified by the user; and i) classify, with the trained machine learning model, extracted structured text in the remaining documents in the batch of documents.

Another illustrative embodiment provides a computer program product for training and using a machine learning model for data extraction. The computer program product comprises a computer-readable storage medium having program instructions embodied thereon to perform the steps of: a) receiving input of a number of keys of interest from a user through an interface; b) receiving input of a batch of documents containing unstructured text; c) processing the unstructured text of a first document from the batch of documents to extract structured text; d) predicting, with the machine learning model, text classifications of the structured text according to the keys of interest; e) outputting, through the interface, the predicted text classifications to the user; f) receiving, through the interface, annotations from the user to correct any incorrect predictions; g) retraining the machine learning model according to the annotations; h) repeating steps c) through g) for less than ten additional documents from the batch of documents until the machine learning model has been trained to predict text classifications with a level of accuracy specified by the user; and i) classifying, with the trained machine learning model, extracted structured text in the remaining documents in the batch of documents.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 depicts a document page with extracted text blocks in accordance with an illustrative embodiment;

FIG. 9 depicts a diagram illustrating the user interface after the machine model is trained in accordance with an illustrative embodiment;

DETAILED DESCRIPTION

The illustrative embodiments recognize and take into account one or more different considerations. The illustrative embodiments recognize and take into account that current information extraction methods support a limited set of hyper-specialized document types and are not customizable by users. Given the same document, different users may be interested in different text with their own selection standard. Historically, these differences between users require users to implement their own selection rules.

The illustrative embodiments also recognize and take into account that current information extraction methods reply on complex hand-crafted rules-based systems or use transformer-based neural networks for machine learning systems, which require large amounts of training data and large computational resources for training and inference. Due to the complexity and variety of unstructured documents it is not feasible to build a generalizable information system based on a collection of hand-crafted rules. Any supervised machine earning model requires training data to learn a given task. Acquiring such training data is very difficult, time-consuming and costly.

The illustrative embodiments provide a machine learning text extraction method based on user-defined sets of keys of interest from unstructured text documents. The machine learning model is able to learn to associate keys of interest with the corresponding values in the documents based on a limited amount of training data. Instead of hand-crafted rules, the illustrative embodiments use graph neural networks for the task of key-value extraction. The graph neural network may be able to learn from just a few annotated training examples (e.g., only three document pages.) The key-value extraction system can learn each user's specific requirements by using a unique prediction head layer for each different user or different use case.

Figure 1:
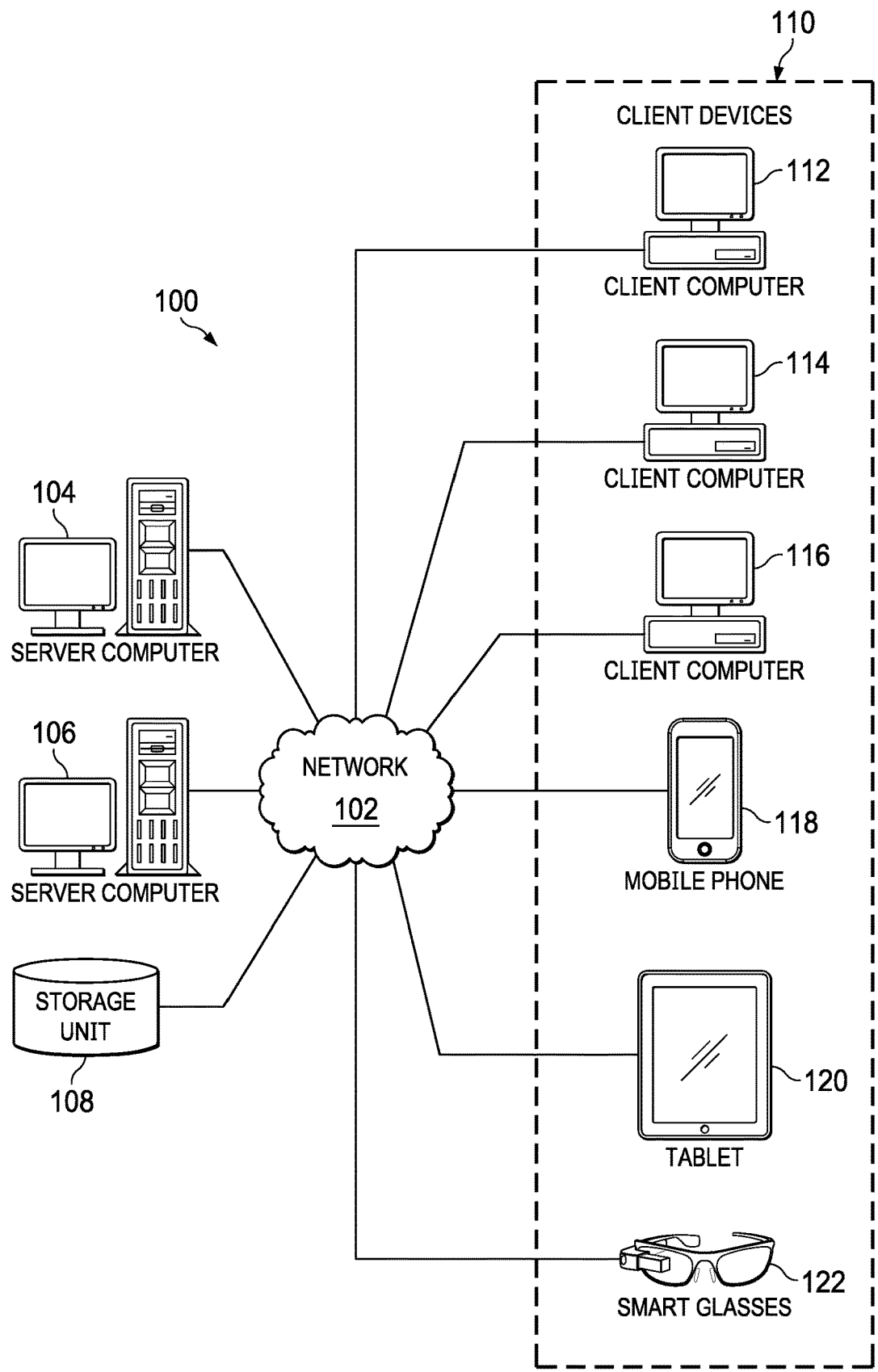
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
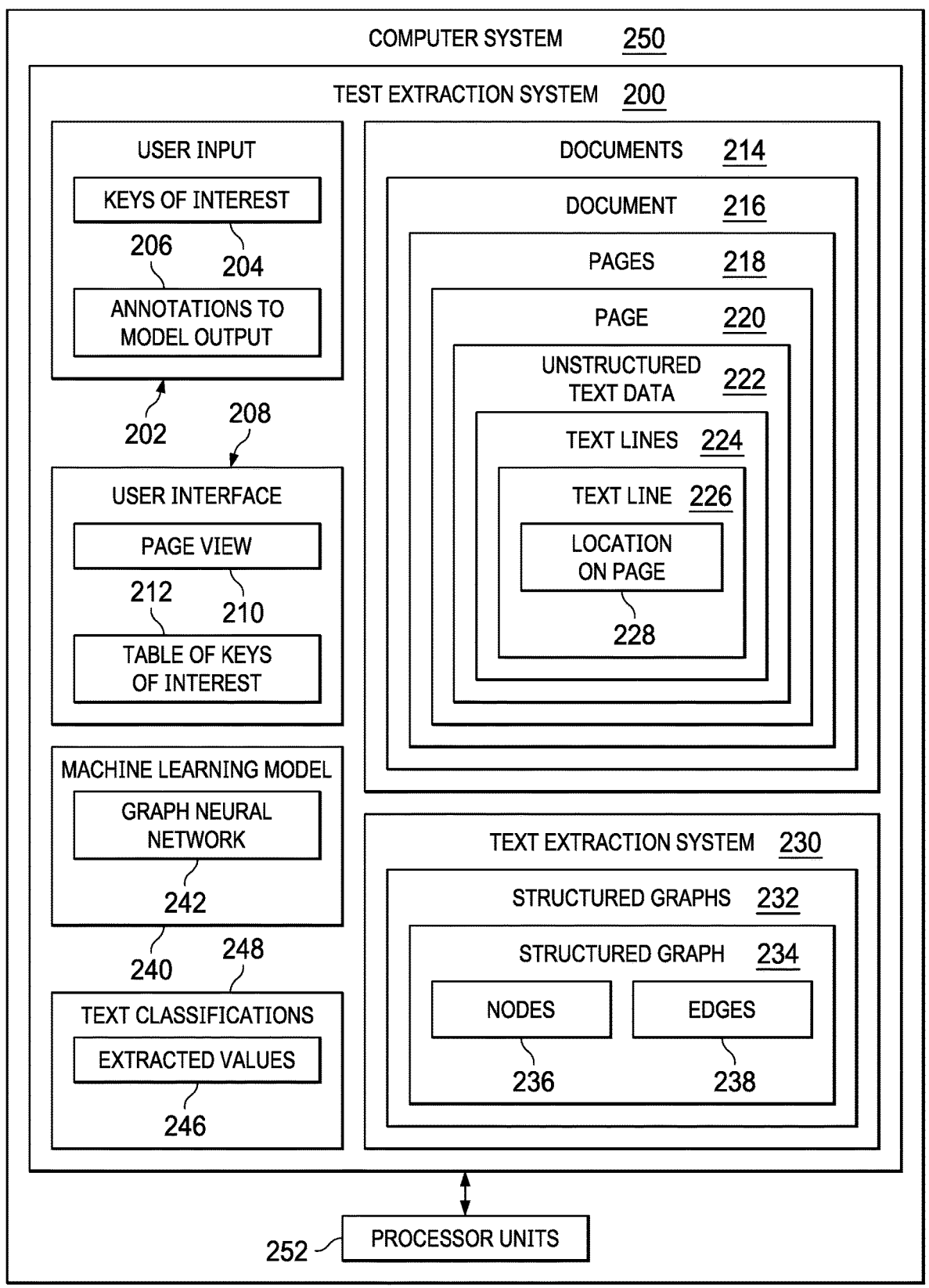
FIG. 2 is a block diagram of a document processing system for key-value extraction depicted in accordance with an illustrative embodiment.

FIG. 2 is a block diagram of a document processing system for key-value extraction depicted in accordance with an illustrative embodiment. Text extraction system 200 might be implemented in network data processing system 100 in FIG. 1.

Text extraction system 200 receives user input 202 through user interface 208. User input 202 may comprise keys of interest 204 that the user wishes to identify in a batch of documents 214. User input may also comprise annotations 206 to output received from the machine learning model 240.

Each document 216 in the batch of documents 214 comprises a number of pages 218. Each page 220 contains unstructured text data 222 comprising a number of text lines 224. Each text line 226 has a specific location 228 on the page 220.

Text extraction system 230 processes the unstructured text data 222 in documents 214 and extracts structured text data in the form of Structured graphs 232. Each structured graph 234 comprises a number of nodes 236 representing text blocks and edges 238 that connect the nodes 236 based on nearest neighbors in the structured graph 234 and the order of text on the page.

Machine learning model 240 analyzes the structured graphs 232 produced by text extraction system 230 and generates predicted text classifications 248 comprising extracted values 246 for the keys of interest 204 provided by the user (i.e., key-value pairs). Machine learning model 240 may comprises a graph neural network (GNN) 242.

The text classifications 248 are output to the user through user interface 208. User interface may present a page view 210 showing the structured text and keys of interest identified by the machine learning model 240. User interface 208 may also present the user with a table 212 of the keys of interest 204 and corresponding extracted values 246.

The user may use the user interface 208 for inputting annotations 206 to the text classifications 248 during training of the machine learning model 240.

Text extraction system 200 can be implemented in software, hardware, firmware, or a combination thereof. When software is used, the operations performed by text extraction system 200 can be implemented in program code configured to run on hardware, such as a processor unit. When firmware is used, the operations performed by text extraction system 200 can be implemented in program code and data and stored in persistent memory to run on a processor unit. When hardware is employed, the hardware may include circuits that operate to perform the operations in text extraction system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components for text extraction system 200 can be located in computer system 250, which is a physical hardware system and includes one or more data processing systems. When more than one data processing system is present in computer system 250, those data processing systems are in communication with each other using a communications medium. The communications medium can be a network. The data processing systems can be selected from at least one of a computer, a server computer, a tablet computer, or some other suitable data processing system.

For example, text extraction system 200 can run on one or more processors 252 in computer system 250. s used herein a processor unit is a hardware device and is comprised of hardware circuits such as those on an integrated circuit that respond and process instructions and program code that operate a computer. When one or more processors 252 execute instructions for a process, one or more processors 252 that can be on the same computer or on different computers in computer system 250. In other words, the process can be distributed between processors 252 on the same or different computers in computer system 250. Further, one or more processors 252 can be of the same type or different type of processors 252. For example, one or more processors 252 can be selected from at least one of a single core processor, a dual-core processor, a multi-processor core, a general-purpose central processing unit (CPU), a graphics processing unit (GPU), a digital signal processor (DSP), or some other type of processor.

Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

Training the machine learning model the illustrative embodiments to perform key-value extraction performed by is a supervised multi-class classification problem wherein the predictions are made for each individual text box on a document page. For example, on a document page with a company's balance sheet, in order associate values with the keys "assets" and "liabilities" for this page a separate class prediction can be made for each candidate text box using one of three classes: "assets," "liabilities," and "other."

Therefore, training data for the above formulation of the key-value extraction task is collected by assigning ground truth classes (keys) of interest to the text boxes extracted from a document page.

The machine learning model for the key-value extraction task can be either initialized blank or trained using some pre-labeled training data. All subsequent training data for actively re-training the user-specific machine learning model is collected directly through the user interface.

Figure 3:
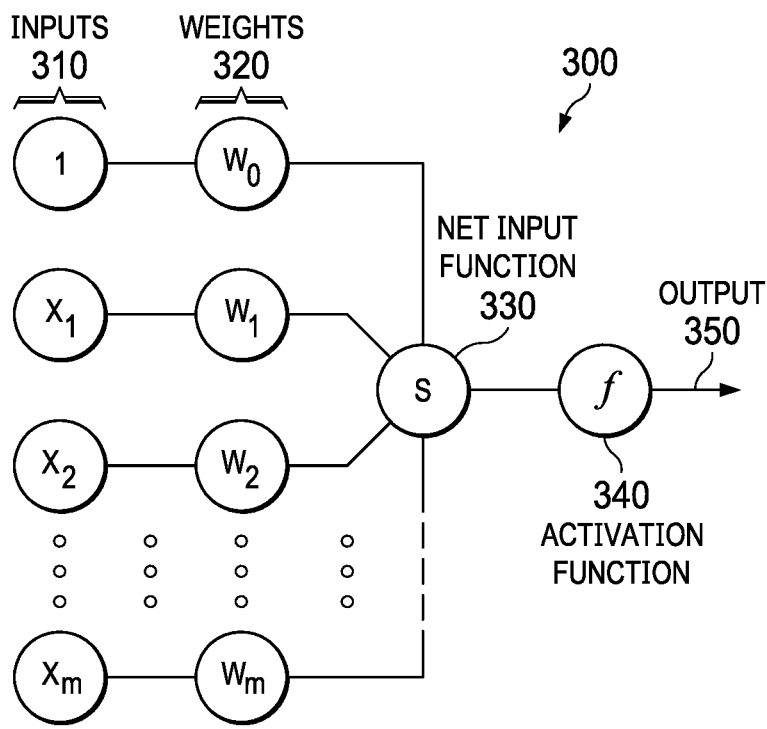
FIG. 3 depicts a diagram illustrating a node in a neural network in which illustrative embodiments can be implemented.

FIG. 3 depicts a diagram illustrating a node in a neural network in which illustrative embodiments can be implemented. Node 300 combines multiple inputs 310 from other nodes. Each input 310 is multiplied by a respective weight 320 that either amplifies or dampens that input, thereby assigning significance to each input for the task the algorithm is trying to learn. The weighted inputs are collected by a net input function 330 and then passed through an activation function 340 to determine the output 350. The connections between nodes are called edges. The respective weights of nodes and edges might change as learning proceeds, increasing or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Figure 4:
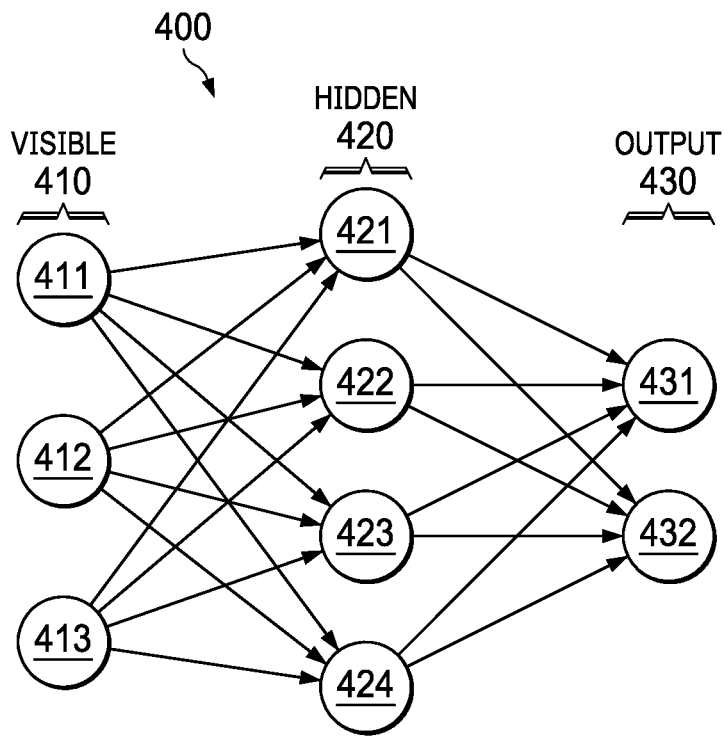
FIG. 4 depicts a diagram illustrating a neural network in which illustrative embodiments can be implemented.

FIG. 4 depicts a diagram illustrating a neural network in which illustrative embodiments can be implemented. As shown in FIG. 4, the nodes in the neural network 400 are divided into a layer of visible nodes 410, a layer of hidden nodes 420, and a layer of output nodes 430. The nodes in these layers might comprise nodes such as node 300 in FIG. 3. The visible layer 410 are those that receive information from the environment (i.e., a set of external training data). Each visible node in visible layer 410 takes a low-level feature from an item in the dataset and passes it to the hidden nodes in the hidden layer 420. When a node in the hidden layer 420 receives an input value x from a visible node in visible layer 410 it multiplies x by the weight assigned to that connection (edge) and adds it to a bias b. The result of these two operations is then fed into an activation function which produces the node's output.

In fully connected feed-forward networks, each node in one layer is connected to every node in the next layer. For example, node 421 in hidden layer 420 receives input from all of the visible nodes 411, 412, and 413 in visible layer 410. Each input value x from the separate nodes 411-413 is multiplied by its respective weight, and all of the products are summed. The summed products are then added to the hidden layer bias, which is a constant value that is added to the weighted sum to shift the result of the activation function and thereby provide flexibility and prevent overfitting the dataset. The result is passed through the activation function to produce output to output nodes 431 and 432 in output layer 430. A similar process is repeated at hidden nodes 422, 423, and 424. In the case of a deeper neural network, the outputs of hidden layer 420 serve as inputs to the next hidden layer.

Neural network layers can be stacked to create deep networks. After training one neural net, the activities of its hidden nodes can be used as inputs for a higher level, thereby allowing stacking of neural network layers. Such stacking makes it possible to efficiently train several layers of hidden nodes. Examples of stacked networks include deep belief networks (DBN), recurrent neural networks (RNN), convolutional neural networks (CNN), and graph neural networks (GNN).

Graph neural networks are orders of magnitude smaller than transformers in the number of model parameters and are significantly faster during training and inference.

Figure 5:
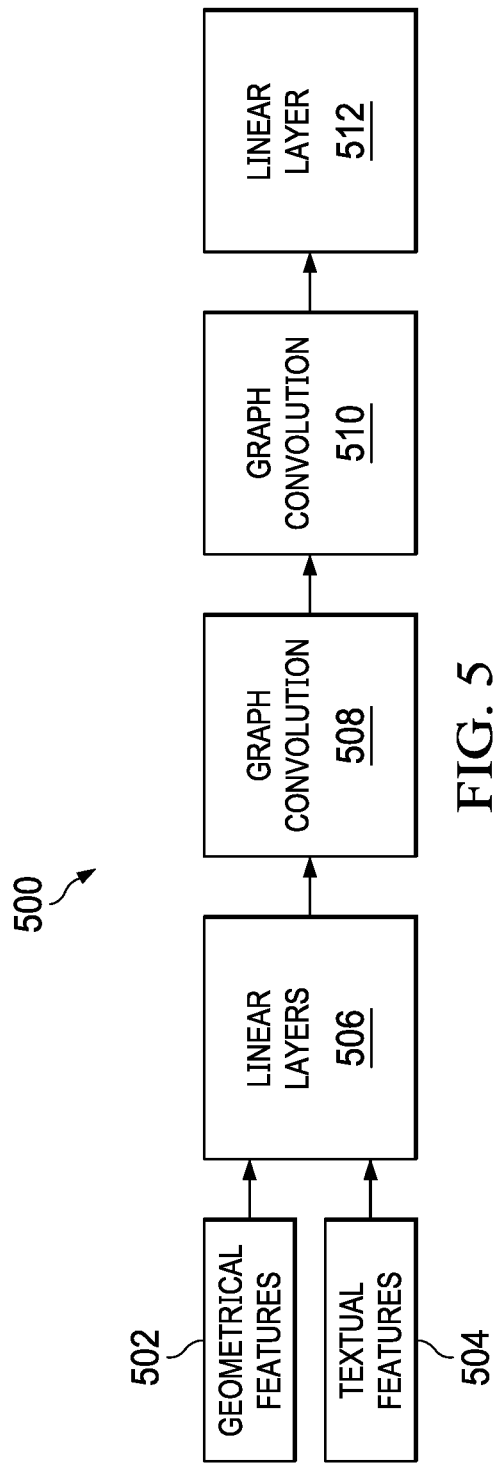
FIG. 5 depicts a diagram illustrating a graph neural network in accordance with an illustrative embodiment.

FIG. 5 depicts a diagram illustrating a graph neural network in accordance with an illustrative embodiment. GNN 500 might be an example of GNN 242 in FIG. 2.

GNN 500 receives input in the form of geometrical features 502 and textual features 504 related to extracted structured text on a document page. The geometrical features 502 and textual features 504 are node features of a connected graph (see FIG. 7) produced by the text extraction system (i.e., text extraction system 230).

The supervised classification problem described above is posed as a graph node classification. For each node in the graph, GNN 500 predicts one of the multiple classes based on the keys of interest specified by the user, together with class probabilities, which can be interpreted as the model's confidence in its predictions for a given class. The higher the score, the more confidence that the value is associated with the key (class) of interest.

The node features of the connected graph are first enhanced through a number of linear layers 506. The node features then pass through multiple graph convolutional layers 508, 510 to propagate information from neighboring nodes. The convolutional layers 508, 510 learn features to classify nodes by inspecting neighboring nodes in the structured graph. Finally, a linear output layer 512 with a softmax function generates output logits that are converted into class probabilities.

It should be noted that the architecture of GNN 500 does not require large amounts of labeled training data to perform well on unseen documents. This quality allows users to train custom machine learning models for their specific needs (document types of keys of interest) in a short period of time using a small amount of labeled training data. The more documents are uploaded and annotated by the user, the more confident and accurate the system becomes. It should also be noted that unseen documents are expected to have similar page layout and key-value representation format as the user-annotated documents used to train the model.

FIG. 6 depicts a document page with extracted text blocks in accordance with an illustrative embodiment. The boxes indicate all extracted text on page 600. In the present example, the page is a new case sheet for a law firm. The keys of interest designated by the user are the name/address 602 and phone number 604 of the client.

The raw bytes of the document page 600 are converted into a structured representation of text in the form of a list of text box objects wherein each object corresponds to a single line of text (or table/form cell) and contain the following data: text, location on the page in a 2D coordinate system relative to the page size, and additional metadata collected from the document (e.g., font, color, etc.).

As used herein, text extraction refers to extracting individual characters and their corresponding locations on a document page as well as subsequent merging of those characters into coherent text represented by individual lines. In other words, converting unstructured text into structured text. Text content from each page is represented as a list of text lines and their locations.

The illustrative embodiments can work with any document format as well as any implementation of text extraction component as long as the input and output formats are preserved. This support includes unstructured documents that do not have an embedded text layer and require optical character recognition (OCR) such as, e.g., PDFs with images of scanned documents, etc.

Figure 7:
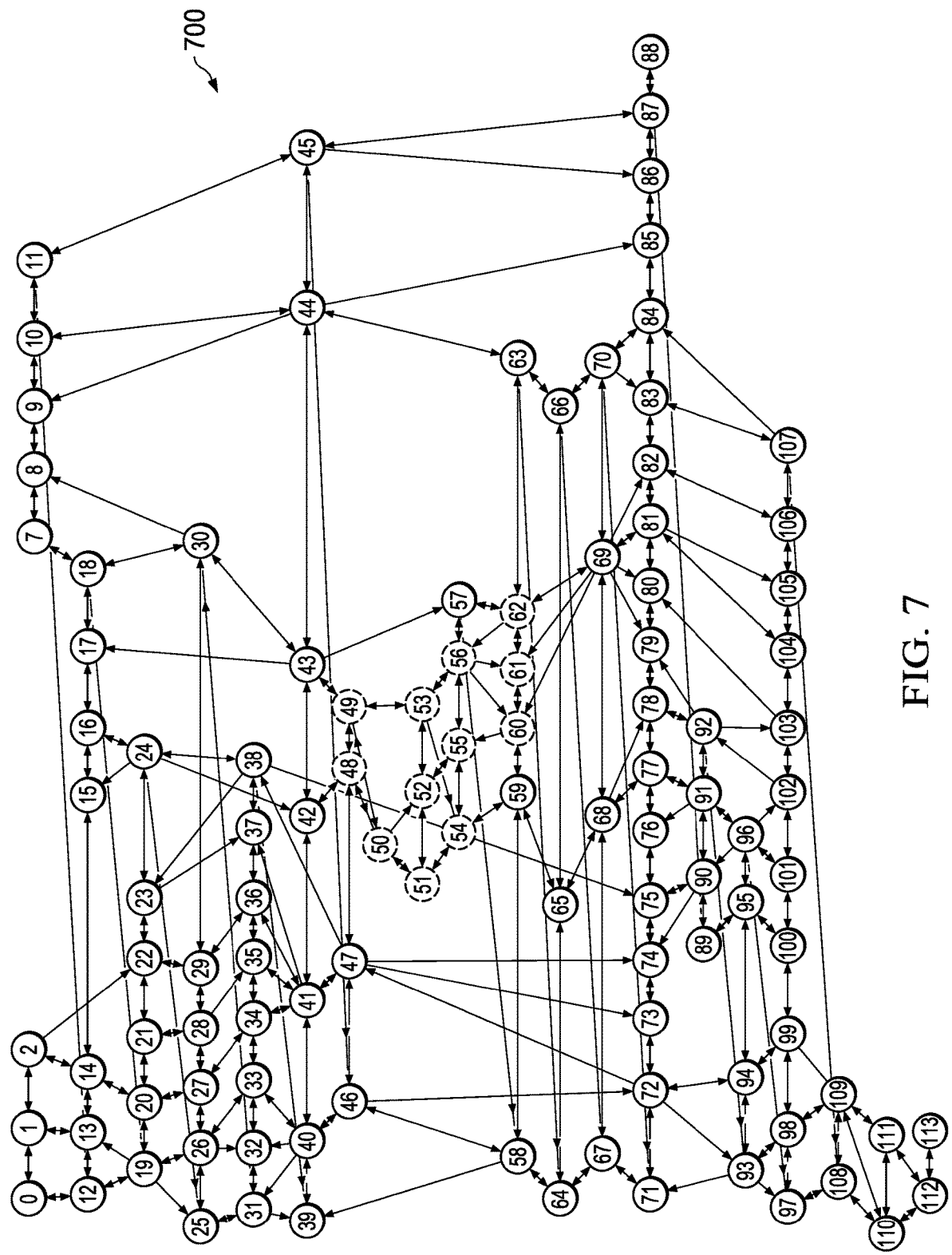
FIG. 7 depicts a structured graph of extracted text in accordance with an illustrative embodiment.

FIG. 7 depicts a structured graph of extracted text in accordance with an illustrative embodiment. In the present example, graph 700 is generated from the extracted text from page 600 in FIG. 6.

Each node in graph 700 represents a text box, and each edge is based on nearest neighbors in the top, bottom, left, and right directions, as well as their order of the text on the page. The graph structure itself is useful for information propagation and aggregation.

For each node, the text extraction system computes a set of textual features based on the text content of the text box (see 504 in FIG. 5). The text extraction system also computes geometrical features based on the location of text boxes on the document page (see 502 in FIG. 5). The textual features help to locate the candidate value nodes, thereby increasing the recall of the machine learning model. The geometrical features help narrow the candidate value nodes to the ones the user is actually interested in, thereby increasing the precision of the machine learning model. In the present example, nodes 48-56 represent name/address text 602 in FIG. 6, and nodes 60-62 represent phone number 604.

Figure 8:
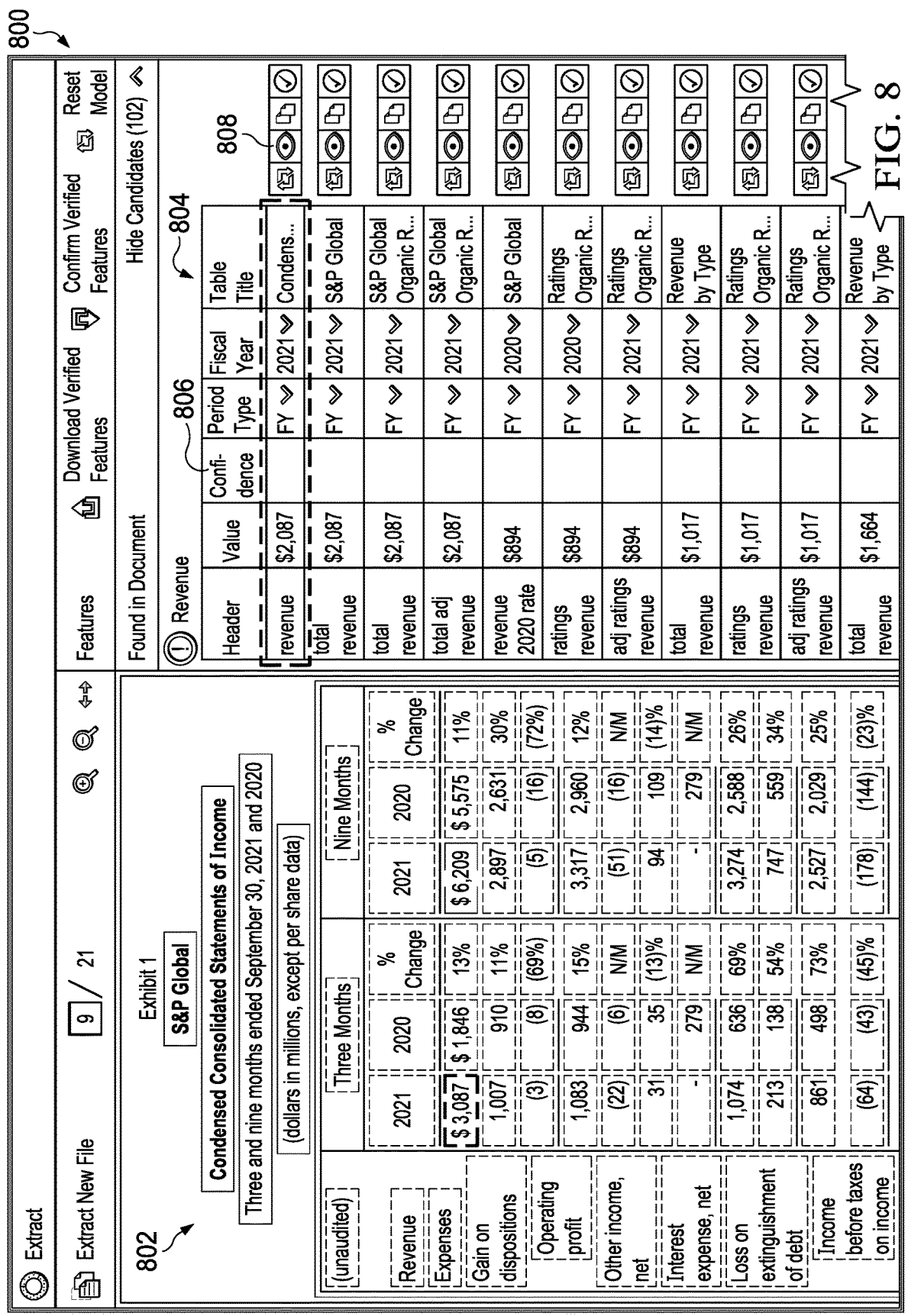
FIG. 8 depicts a diagram illustrating a user interface displaying key-value extraction before training in accordance with an illustrative embodiment.
Figure 9:
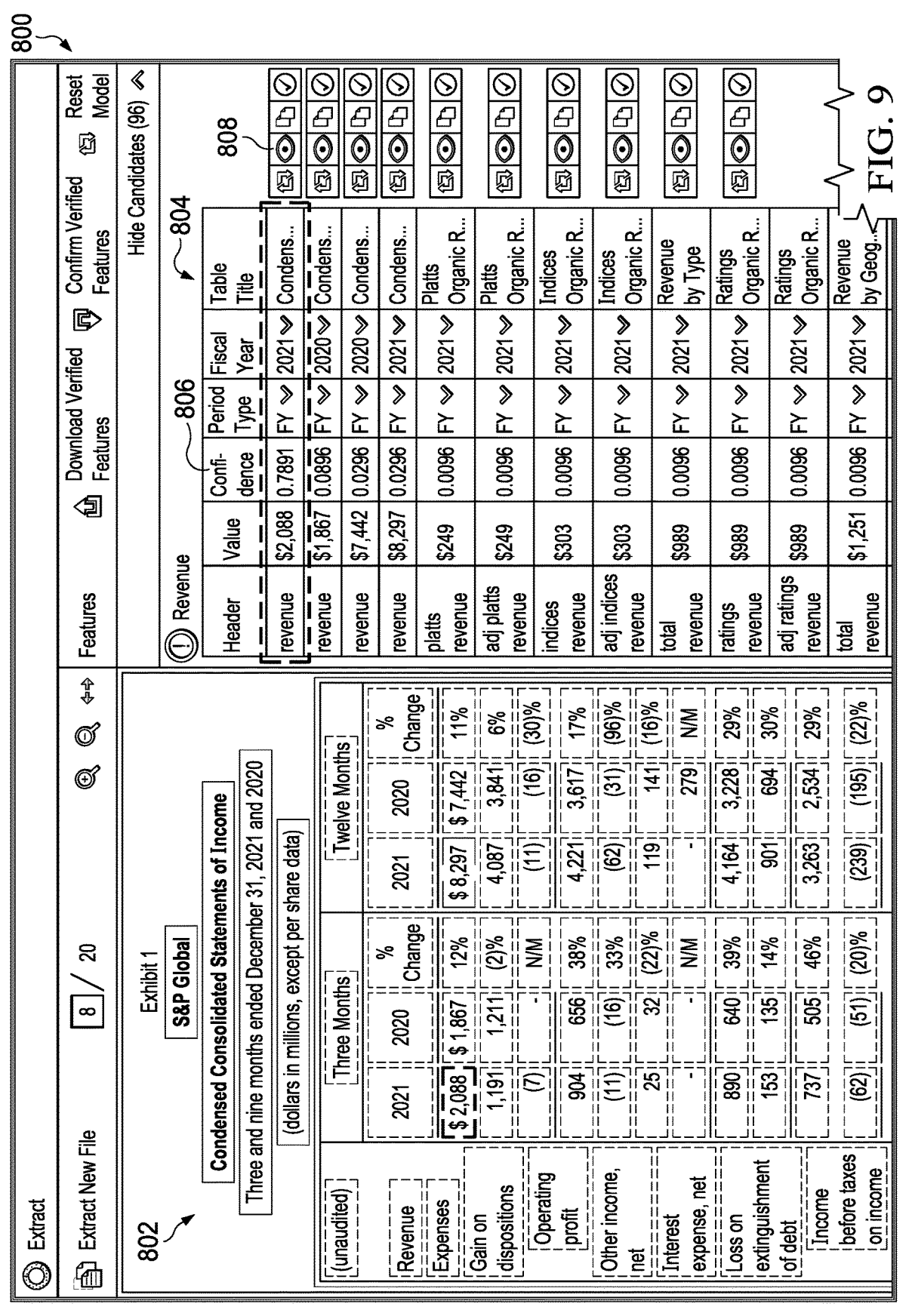

FIG. 8 depicts a diagram illustrating a user interface displaying key-value extraction before training in accordance with an illustrative embodiment. FIG. 9 depicts a diagram illustrating the user interface after the machine model is trained. User interface (UI) 800 might be an example implementation of user interface 208 in FIG. 2.

UI 800 enables uploading custom documents and rendering the documents (including output of the text extraction component) in page view 802.

The extracted values for each key of interest may be displayed in a table 804 adjacent the page view 802. Each extracted value may be displayed as a single row with an associated confidence score 806 (based on model predictions) and a link 808 to the original location in the document from which the value was extracted.

UI 800 may be used to edit extracted values and to confirm and save correctly extracted values as training datasets for use in training or re-training the machine learning model.

As can be seen in FIG. 8, before the model is trained, the confidence score 806 is blank. In FIG. 9, after the model has been trained, there is a confidence score of 79% that the first choice is the correct answer.

Figure 10:
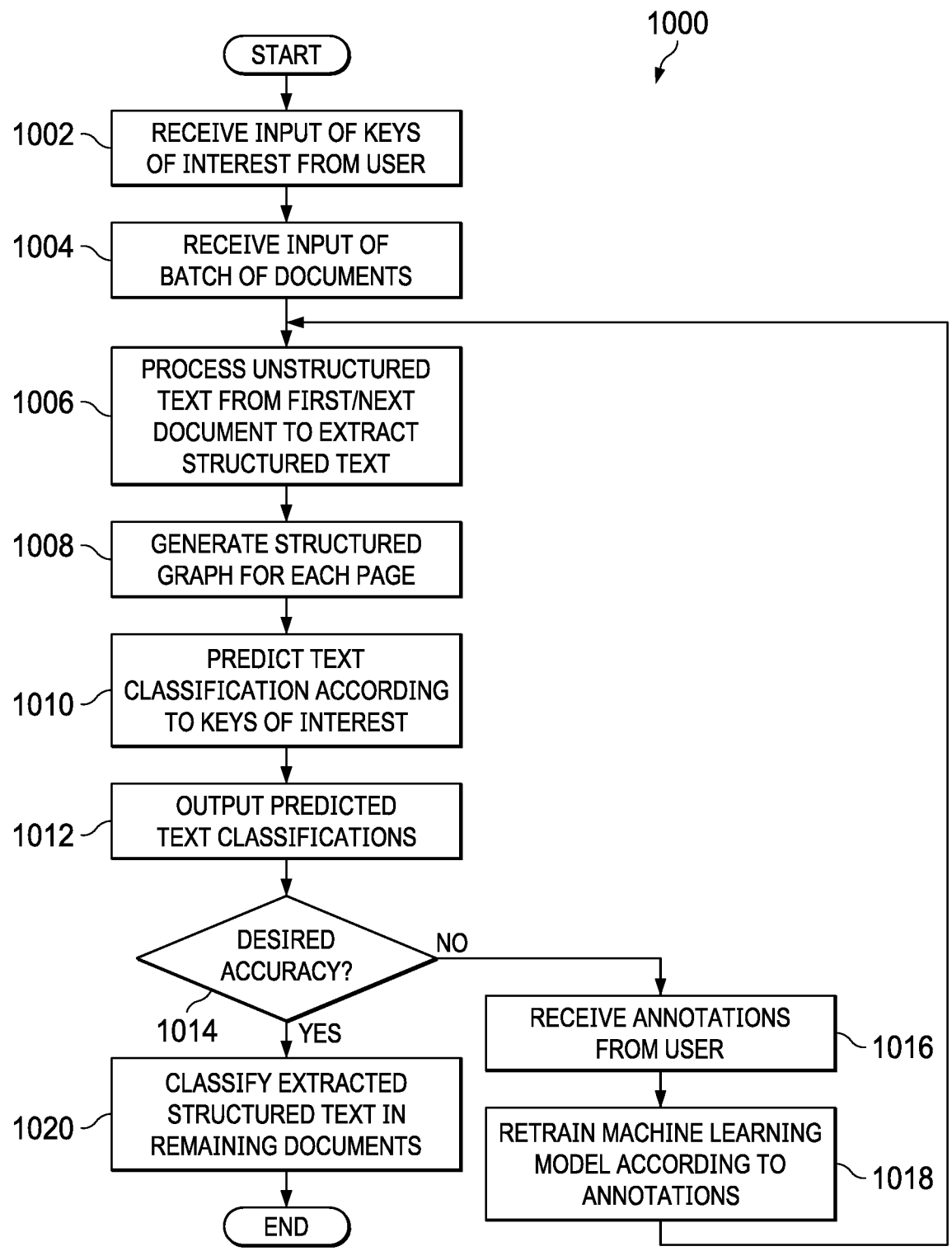
FIG. 10 depicts a flowchart illustrating a process for training and using a machine learning model for data extraction in accordance with an illustrative embodiment.

FIG. 10 depicts a flowchart illustrating a process for training and using a machine learning model for data extraction in accordance with an illustrative embodiment. Process 1000 might be implemented in text extraction system 200 in FIG. 2.

Process 1000 begins by receiving input of a number of keys of interest received from a user through an interface (step 1002) and receiving input of a batch of documents containing unstructured text (step 1004).

The system processes the unstructured text of a first document from the batch of documents to extract structured text (step 1006) and to generate a structured graph for each document page (step 1008). The structured graph may comprise text data represented as nodes in a two-dimensional coordinate system relative to the page and edges connecting the nodes based on nearest neighbors in the structured graph and order of text on the page. The nodes represent text boxes corresponding to lines of text. Ground truth keys of interest may be assigned to the text data in user-specified document locations as training data.

The system then predicts, with the machine learning model, text classifications of the structured text according to the keys of interest (step 1010). The machine learning model may be a graph neural network comprising a number of graph convolutional layers and a number of linear layers. The machine learning model predicts text classifications according to relative locations of neighboring text data in the two-dimensional coordinate system and the meaning of the text.

The system outputs the predicted text classifications to the user through the interface (step 1012). The interface may present the user with a confidence score for predicted text classifications. The interface may present extracted text classification values in a table adjacent to an image of a corresponding page of the document.

If the predictions do not have the desired level of accuracy (step 1014), the system receives, through the interface, annotations from the user to correct any incorrect predictions (step 1016). The machine learning model is then retrained according to the annotations (step 1018).

After retraining the machine learning model steps 1006 through 1018 are repeated for less than ten additional documents from the batch of documents until the machine learning model has been trained to predict text classifications with the desired level of accuracy specified by the user. Therefore, the illustrative embodiments are able to achieve the desired level of accuracy using ten or less total training documents.

Once the machine learning model has achieved the desired level of accuracy, the system then classifies, with the trained machine learning model, extracted structured text in the remaining documents in the batch of documents (step 1020). Process 1000 then ends.

Figure 11:
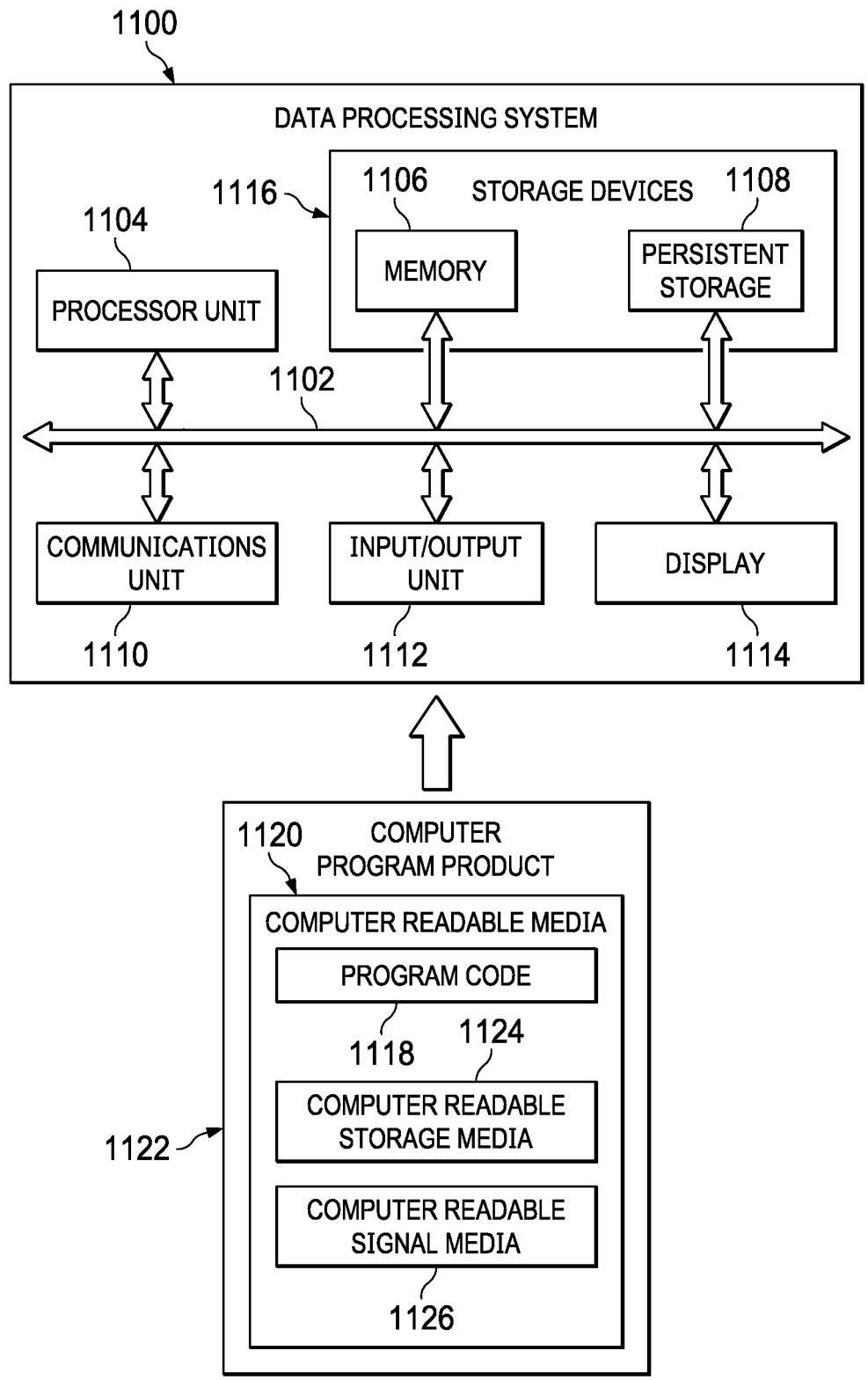
FIG. 11 is a block diagram of a data processing system in accordance with an illustrative embodiment.

Turning now to FIG. 11, an illustration of a block diagram of a data processing system is depicted in accordance with an illustrative embodiment. Data processing system 1100 may be used to implement server computers 104 and 106 and client devices 110 in FIG. 1, as well as computer system 250 in FIG. 2. In this illustrative example, data processing system 1100 includes communications framework 1102, which provides communications between processor unit 1104, memory 1106, persistent storage 1108, communications unit 1110, input/output unit 1112, and display 1114. In this example, communications framework 1102 may take the form of a bus system.

Processor unit 1104 serves to execute instructions for software that may be loaded into memory 1106. Processor unit 1104 may be a number of processors, a multi-processor core, or some other type of processor, depending on the particular implementation. In an embodiment, processor unit 1104 comprises one or more conventional general-purpose central processing units (CPUs). In an alternate embodiment, processor unit 1104 comprises one or more graphical processing units (CPUs).

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108. Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer-usable program code, or computer-readable program code that may be read and executed by a processor in processor unit 1104. The program code in the different embodiments may be embodied on different physical or computer-readable storage media, such as memory 1106 or persistent storage 1108.

Program code 1118 is located in a functional form on computer-readable media 1120 that is selectively removable and may be loaded onto or transferred to data processing system 1100 for execution by processor unit 1104. Program code 1118 and computer-readable media 1120 form computer program product 1122 in these illustrative examples. In one example, computer-readable media 1120 may be computer-readable storage media 1124 or computer-readable signal media 1126.

In these illustrative examples, computer-readable storage media 1124 is a physical or tangible storage device used to store program code 1118 rather than a medium that propagates or transmits program code 1118. Computer readable storage media 1124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1118 may be transferred to data processing system 1100 using computer-readable signal media 1126. Computer-readable signal media 1126 may be, for example, a propagated data signal containing program code 1118. For example, computer-readable signal media 1126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code 1118.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for training and using a machine learning model for data extraction, the method comprising:
   using a number of processors to perform the steps of:
   a) receiving input of a number of keys of interest from a user through an interface;
   b) receiving input of a batch of documents containing unstructured text data;
   c) processing the unstructured text data of a document from the batch of documents to extract lines of text and corresponding locations of the lines of text on a page of the document to generate a structured graph, wherein the structured graph is a directed graph comprising nodes representing the lines of text and edges connecting the nodes and indicating nearest neighbors of the lines of text on the page and order of the lines of text on the page;
   d) predicting, with the machine learning model, text classifications of the lines of text corresponding to the keys of interest using a graph neural network, wherein predicting applies edges and nodes of the structured graph as inputs to the graph neural network, wherein the graph neural network inspects neighboring nodes, and wherein the graph neural network generates class probabilities representing a confidence that the lines of text correspond to the keys of interest;
   e) outputting, through the interface, the class probabilities for predicted text classifications to the user;
   f) receiving, through the interface, annotations from the user to correct any incorrect predicted text classifications;

g) retraining the machine learning model according to the annotations;

h) repeating steps c) through g) for less than ten additional documents from the batch of documents until the machine learning model has been trained to predict text classifications with a level of accuracy specified by the user, wherein the level of accuracy specified by the user corresponds to a level of confidence based on the class probabilities; and i) classifying, with the trained machine learning model, lines of text in the remaining documents in the batch of documents.

2. The method of claim 1, wherein:
the nodes of the structured graph represent the lines of text in a two-dimensional coordinate system relative to the page of the document.

3. The method of claim 2, wherein the nodes represent text boxes corresponding to the lines of text.

4. The method of claim 3, wherein ground truth keys of interest are assigned to the lines of text in user-specified document locations as training data.

5. The method of claim 1, wherein the machine learning model comprises a graph neural network.

6. The method of claim 5, wherein the graph neural network comprises a number of graph convolutional layers and a number of linear layers.

7. The method of claim 1, wherein the interface presents the user with a confidence score for predicted text classifications.

8. The method of claim 1, wherein the interface presents extracted text classification values in a table adjacent an image of a corresponding page of the document.

9. A system for training and using a machine learning model for data extraction, the system comprising:
a storage device configured to store program instructions; and
one or more processors operably connected to the storage device and configured to execute the program instructions to cause the system to:
a) receive input of a number of keys of interest from a user through an interface;
b) receive input of a batch of documents containing unstructured text data;
c) process the unstructured text data of a document from the batch of documents to extract lines of text and corresponding locations of the lines of text on a page of the document to generate a structured graph, wherein the structured graph is a directed graph comprising nodes representing the lines of text and edges connecting the nodes and indicating nearest neighbors of the lines of text on the page and order of the lines of text on the page;
d) predict, with the machine learning model, text classifications of the lines of text corresponding to the keys of interest using a graph neural network, wherein the system predicts the text classifications by applying edges and nodes of the structured graph as inputs to the graph neural network, wherein the graph neural network inspects neighboring nodes, and wherein the graph neural network generates class probabilities representing a confidence that the lines of text correspond to the keys of interest;
e) output, through the interface, the class probabilities for predicted text classifications to the user;
f) receive, through the interface, annotations from the user to correct any incorrect predicted text classifications;

g) retrain the machine learning model according to the annotations;

h) repeat steps c) through g) for less than ten additional documents from the batch of documents until the machine learning model has been trained to predict text classifications with a level of accuracy specified by the user, wherein the level of accuracy specified by the user corresponds to a level of confidence based on the class probabilities; and i) classify, with the trained machine learning model, extracted lines of text in the remaining documents in the batch of documents.

10. The system of claim 9, wherein:
the nodes of the structured graph represent the lines of text in a two-dimensional coordinate system relative to the page of the document.

11. The system of claim 10, wherein the nodes represent text boxes corresponding to the lines of text.

12. The system of claim 11, wherein ground truth keys of interest are assigned to the lines of text in user-specified document locations as training data.

13. The system of claim 9, wherein the machine learning model comprises a graph neural network.

14. The system of claim 13, wherein the graph neural network comprises a number of graph convolutional layers and a number of linear layers.

15. The system of claim 9, wherein the interface presents the user with a confidence score for predicted text classifications.

16. The system of claim 9, wherein the interface presents extracted text classification values in a table adjacent an image of a corresponding page of the document.

17. A computer program product for training and using a machine learning model for data extraction, the computer program product comprising:
a computer-readable storage medium having program instructions embodied thereon to perform the steps of:
a) receiving input of a number of keys of interest from a user through an interface;
b) receiving input of a batch of documents containing unstructured text data;
c) processing the unstructured text data of a document from the batch of documents to extract lines of text and corresponding locations of the lines of text on a page of the document to generate a structured graph, wherein the structured graph is a directed graph comprising nodes representing the lines of text and edges connecting the nodes and indicating nearest neighbors of the lines of text on the page and order of the lines of text on the page;
d) predicting, with the machine learning model, text classifications of the lines of text corresponding to the keys of interest using a graph neural network, wherein predicting applies edges and nodes of the structured graph as inputs to the graph neural network, wherein the graph neural network inspects neighboring nodes, and wherein the graph neural network generates class probabilities representing a confidence that the lines of text correspond to the keys of interest;
e) outputting, through the interface, the class probabilities for predicted text classifications to the user;
f) receiving, through the interface, annotations from the user to correct any incorrect predicted text classifications;
g) retraining the machine learning model according to the annotations;

h) repeating steps c) through g) for less than ten additional documents from the batch of documents until the machine learning model has been trained to predict text classifications with a level of accuracy specified by the user, wherein the level of accuracy specified by the user corresponds to a level of confidence based on the class probabilities; and i) classifying, with the trained machine learning model, extracted lines of text in the remaining documents in the batch of documents.

18. The computer program product of claim 17, wherein: the nodes of the structured graph represent the lines of text in a two-dimensional coordinate system relative to the page of the document.

19. The computer program product of claim 18, wherein the nodes represent text boxes corresponding to the lines of text.

20. The computer program product of claim 19, wherein ground truth keys of interest are assigned to the lines of text in user-specified document locations as training data.

21. The computer program product of claim 17, wherein the machine learning model comprises a graph neural network.

22. The computer program product of claim 21, wherein the graph neural network comprises a number of graph convolutional layers and a number of linear layers.

23. The computer program product of claim 17, wherein the interface presents the user with a confidence score for predicted text classifications.

24. The computer program product of claim 17, wherein the interface presents extracted text classification values in a table adjacent an image of a corresponding page of the document.

* * * * *